(12) United States Patent
Takeuchi et al.

(10) Patent No.: US 7,016,797 B2
(45) Date of Patent: Mar. 21, 2006

(54) CHANGE-POINT DETECTION APPARATUS, METHOD AND PROGRAM THEREFOR

(75) Inventors: Jun-ichi Takeuchi, Tokyo (JP); Kenji Yamanishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/863,274

(22) Filed: Jun. 9, 2004

(65) Prior Publication Data

US 2004/0254760 A1    Dec. 16, 2004

(30) Foreign Application Priority Data

Jun. 13, 2003   (JP)   .............................. 2003-169986

(51) Int. Cl.
*G01R 29/02* (2006.01)
*G06F 19/00* (2006.01)

(52) U.S. Cl. ...................................................... 702/79
(58) Field of Classification Search ................. 702/79, 702/179–181, 189, 193, 194; 703/6, 13, 703/19

See application file for complete search history.

(56) References Cited

U.S. PATENT DOCUMENTS

2005/0102122 A1 *   5/2005   Maruyama et al. ............ 703/6

OTHER PUBLICATIONS

V. Guralnik and J. Stivastava, "Event Detection from Time Series Data", Proceedings of the Fifth ACM-SIGKDD International Conference on Knowledge Discovery and Data Mining, p. 33-42, ACM Press, 1999.

* cited by examiner

*Primary Examiner*—Michael Nghiem
(74) *Attorney, Agent, or Firm*—Sughrue Mion, PLLC

(57) ABSTRACT

A time-series model learning unit reads in time-series data sequentially, learns the parameters of a time-series model and stores the parameters in a storage device. A loss function calculating unit reads in sequentially from storage each item of the input time-series data one at a time and calculates values of a loss function. A complexity calculating unit sums the loss values to sequentially calculate complexity as fitting error resulting when a time-series model is fit to the input data. Complexity is stored. A change-point searching unit reads in complexity regarding time-series data before and after change-point candidates from storage with respect to all change-point candidates, compares the sum of the complexities with complexity regarding all time-series data in a case where a change point is assumed to be absent, calculates the change-point score based upon the difference between the compared values, and detects and outputs the change point.

6 Claims, 8 Drawing Sheets

CHANGE-POINT DETECTION APPARATUS, METHOD AND PROGRAM THEREFOR

FIELD OF THE INVENTION

This invention relates to a change-point detection method, apparatus and program therefor. More particularly, the invention relates to a change-point detection apparatus, method and program whereby a point in time at which a sudden change occurs in time-series data can be detected.

BACKGROUND OF THE INVENTION

An example of a change-point detection apparatus according to the prior art is described by V. Guralnik and J. Stivastava (see V. Guralnik and J. Stivastava, "Event Detection from Time Series Data", Proceedings of the Fifth ACM SIGKDD International Conference on Knowledge Discovery and Data Mining, pp. 33–42, ACM Press, 1999). The scheme according to V. Guralnik and J. Stivastava calculates the sum total of fitting errors in a case where curve fitting has been performed on the assumption that there are no change points and the sum total of fitting errors in a case where curve fitting has been performed separately before and after change-point candidates, and deciding that a change point has occurred if the difference between the sum totals exceeds a certain value.

SUMMARY OF THE DISCLOSURE

A problem with the prior art is that fitting error cannot be calculated online. The reason for this is that since Guralnik and Stivastava adopt a method that calculates fitting error in batches, overall fitting error must be re-calculated whenever data is added on. Further, since model fitting is carried out in batches, it is assumed that the parameters within an interval take on fixed values. Hence the parameter values cannot undergo a smooth temporal change. This lowers the precision of change-point detection.

Accordingly, an object of the present invention is to provide a change-point detection apparatus and method and a program therefor whereby change-point detection is performed efficiently by calculating fitting and complexity corresponding to fitting error online with respect to time-series data, and change points can be detected effectively by performing model fitting in conformity with model discontinuity.

In accordance with a first aspect of the present invention, a change-point detection apparatus for reading in time-series data sequentially as an input and detecting a change point which is a time point where the input time-series data changes suddenly while it is being read in, comprises: time-series model learning means for learning parameters of a time-series model sequentially while the time-series data is read in; a storage device for storing the parameters of the time-series model, which have been learned by the time-series model learning means, and complexity as fitting error that results when the time-series model is fit to the input time-series data; loss-function calculating means for reading in parameters from the storage device and calculating loss of the time-series model with regard to each item of the input time-series data one at a time; complexity calculating means for reading in parameters and complexity from the storage device, calculating complexity of a partial series of the input time-series data sequentially while updating the same, and updating content stored in the storage device; and change-point searching means for reading in complexity with regard to time-series data before and after change-point candidates from the storage device with respect to all change-point candidates of the input time-series data and comparing the sum of the complexities before and after the change-time candidates with complexity when a change point is assumed to be absent, thereby calculating change-point score and detecting a change point, wherein the change point detected by the change-point search means is output.

In accordance with a second aspect of the present invention, a change-point detection apparatus for reading in time-series data sequentially as an input and detecting a change point which is a time point where the input time-series data changes suddenly while it is being read in, comprises: time-series model learning means for learning parameters of a time-series model sequentially while the time-series data is being read in; a storage device for storing the parameters of the time-series model, which have been learned by the time-series model learning means, and complexity as fitting error that results when the time-series model is fit to the input time-series data; loss-function calculating means for reading in parameters from the storage device and calculating loss of the time-series model with regard to each item of the input time-series data one at a time; complexity calculating means for sequentially adding a loss value calculated by the loss-function calculating means to complexity read in from the storage-device, thereby calculating complexity as fitting error of the time-series model to the input time-series data and updating content stored in the storage device; and change-point determination means for reading in complexity with regard to time-series data before and after change-point candidates from the storage device with respect to all change-point candidates of the input time-series data and comparing the sum of the complexities before and after the change-time candidates with complexity when a change point is assumed to be absent, thereby calculating change-point score and detecting a change point, wherein the change point detected by the change-point determination means is output.

In accordance with a third aspect of the present invention, a change-point detection method for reading in time-series data sequentially as an input and detecting a change point which is a time point where the input time-series data changes suddenly while it is being read in, comprises: a step of reading in time-series data sequentially; a step of learning parameters of a time-series model sequentially from the input time-series data; a loss-function calculating step of calculating loss of the time-series model with regard to each item of the input time-series data one at a time; a complexity calculating step of sequentially calculating complexity as fitting error that results when the time-series model is fit to the input time-series data; and a change-point searching step of calculating complexity with regard to time-series data before and after change-point candidates with respect to all change-point candidates of the input time-series data and comparing the sum of the complexities before and after the change-time candidates with complexity when a change point is assumed to be absent, thereby calculating change-point score and detecting a change point, wherein the change point detected at the change-point search step is output.

In accordance with a fourth aspect of the present invention, a change-point detection method for reading in time-series data sequentially as an input and detecting a change point which is a time point where the input time-series data changes suddenly while it is being read in, comprises: a step of reading in time-series data sequentially; a step of learning parameters of a time-series model sequentially from the input time-series data; a loss-function calculating step of calculating loss of the time-series model with regard to each item of the input time-series data one at a time; a complexity calculating step of sequentially adding a loss value calculated at the loss-function calculating step, thereby calculating complexity as a fitting error that results when the time-series model is fit to a partial series of the input time-series data; and a change-point determination step of reading in, from a storage device, complexity with regard to time-series data before and after change-point candidates with respect to all change-point candidates of the input time-series data and comparing the sum of the complexities before and after the change-time candidates with complexity when a change point is assumed to be absent, thereby calculating change-point score and detecting a change point, wherein the change point detected at the change-point determination step is output.

In accordance with a fifth aspect of the present invention, a computer program for change-point detection for causing a computer to operate as: time-series model learning means for learning parameters of a time-series model sequentially while the time-series data is being read in; a storage device for storing parameters of the time-series model, which have been learned by the time-series model learning means, and complexity as fitting error that results when the time-series model is fit to the input time-series data; loss-function calculating means for reading in parameters from the storage device and calculating loss of the time-series model with regard to each item of the input time-series data one at a time; complexity calculating means for reading in parameters and complexity from the storage device, calculating complexity of a partial series of the input time-series data sequentially while updating the same, and updating content stored in the storage device; and change-point searching means for reading in complexity with regard to time-series data before and after change-point candidates from the storage device with respect to all change-point candidates of the input time-series data and comparing the sum of the complexities before and after the change-time candidates with complexity when a change point is assumed to be absent, thereby calculating change-point score and detecting a change point.

In accordance with a sixth aspect of the present invention, a computer program for change-point detection for causing a computer to operate as: time-series model learning means for learning parameters of a time-series model sequentially while the time-series data is being read in; a storage device for storing the parameters of the time-series model, which have been learned by the time-series model learning means, and complexity as fitting error that results when the time-series model is fit to the input time-series data; loss-function calculating means for reading in parameters from the storage device and calculating loss of the time-series model with regard to each item of the input time-series data one at a time; complexity calculating means for sequentially adding a loss value calculated by the loss-function calculating means to complexity read in from the storage device, thereby calculating complexity as fitting error that results when the time-series model is fit to a partial series of the input time-series data, and updating content stored in the storage device; and change-point determination means for reading in complexity with regard to time-series data before and after change-point candidates from the storage device with respect to all change-point candidates of the input time-series data and comparing the sum of the complexities before and after the change-time candidates with complexity when a change point is assumed to be absent, thereby calculating change-point score and detecting a change point.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Preferred embodiments of the present invention will now be described in detail with reference to the accompanying drawings.

[First Embodiment]

Figure 1:
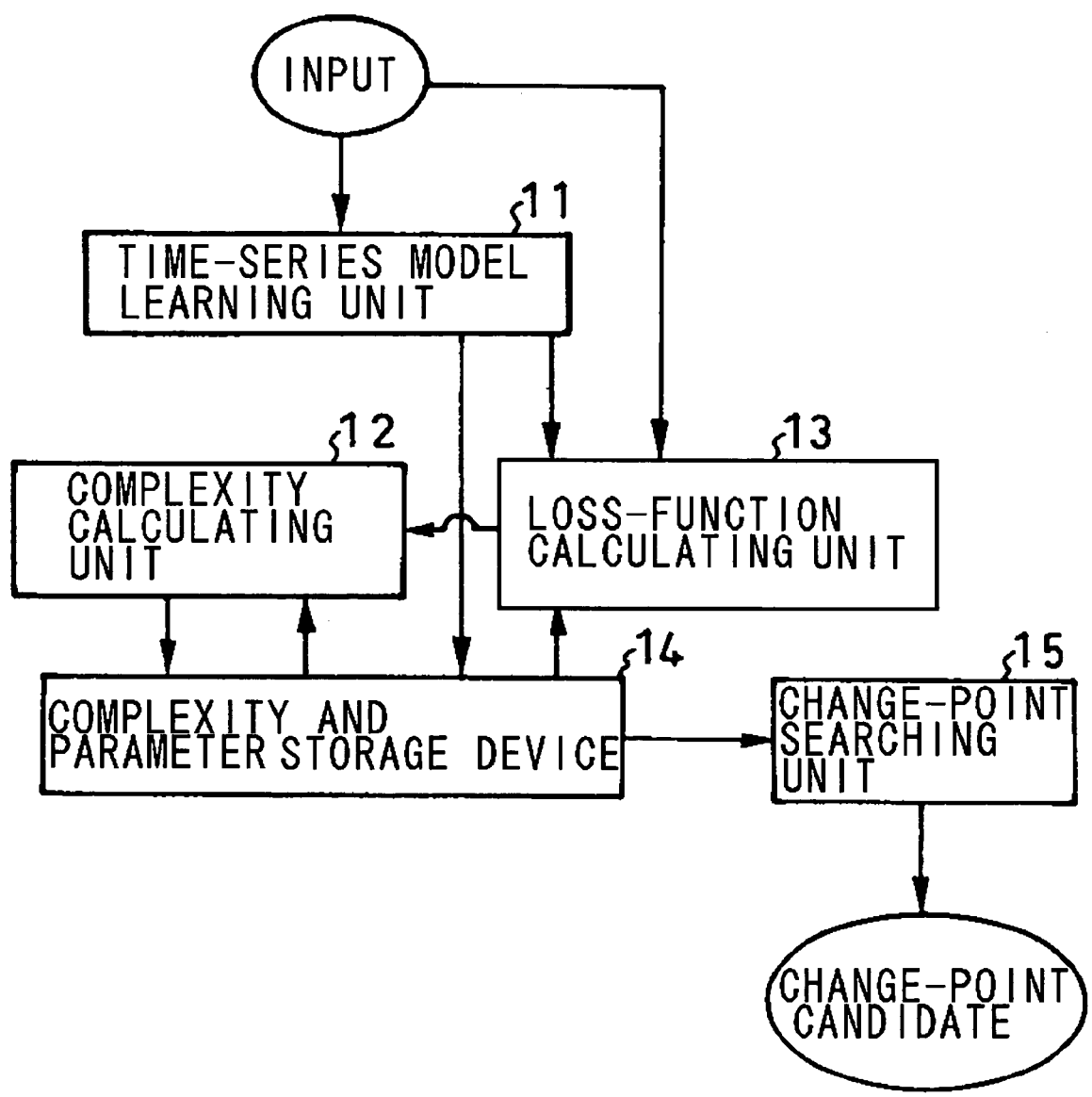
FIG. 1 is a block diagram illustrating the structure of a change-point detection apparatus according to a first embodiment of the present invention.

FIG. 1 is a block diagram illustrating the structure of a change-point detection apparatus according to a first embodiment of the present invention. According to this embodiment, a change point is detected from a data sequence $x^N=x_1, \ldots, x_N$ comprising N-number of items of data. The change-point detection apparatus according to this embodiment comprises a time-series model learning unit 11, a complexity calculating unit 12, a loss-function calculating unit 13, a complexity and parameter storage device 14, and a change-point searching unit 15.

Figure 2:
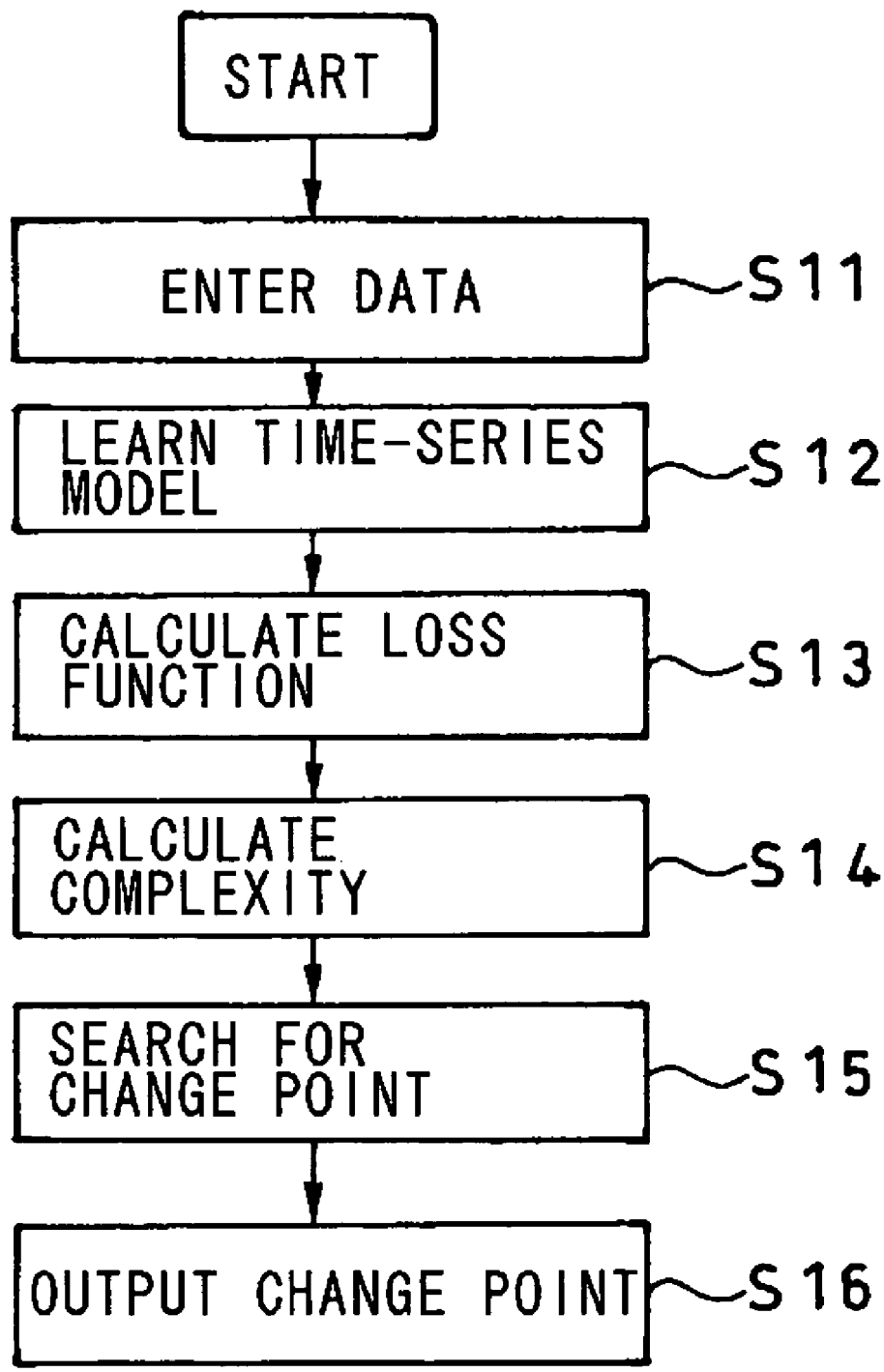
FIG. 2 is a flowchart illustrating operation of the change-point detection apparatus according to the first embodiment.

FIG. 2 is a flowchart illustrating operation of the change-point detection apparatus shown in FIG. 1. The operation of the change-point detection apparatus will now be described.

The time-series model learning unit 11 provides a parametric time-series model and updates parameters while time-series data is sequentially loaded.

The time-series model will be described below. Let $x^N=x_1, \ldots, x_N$ represent a sequence comprising N items of data.

Assume that each item of data is n-dimensional, where n is a given positive integer, and that each element of the n-dimensional data takes on a real-number value.

Assume that such a sequence is produced in accordance with a time-series model having a probability density function $p(x^N|\Theta)(N=1,\ldots)$, where $\Theta$ represents a parameter that specifies probability density. Further, since the probability density of a $t^{th}$ item of data $x_t$ is decided in dependence upon a sequence $x_{t-1}$ prevailing thus far, we may write it as $p(x_t|x_{t-1},\Theta)$.

An auto-regression model (referred to as an "AR model" below), for instance, can be used as an example of the probability density function. If the $t^{th}$ item of data $x_t$ is written as the following equation (1), where $\mu$ represents a parameter, a k-order AR model, where k is a given positive integer is a model decided by the past k-number of items of data and expressed by the following equation (2):

$$x_i = w_i + \mu \quad (1)$$

$$w_t = \sum_{i=1}^{k} A_i w_{t-i} + \varepsilon \quad (2)$$

where $A_i$ (i=1, ..., k) is a square matrix of order n and $\varepsilon$ represents a probability function that is in accordance with a Gaussian distribution of a covariance matrix $\Sigma$ of average value 0.

When expressed as follows:

$$x_{t-k}^{t-1} = (x_{t-1} \cdots x_{t-k}) \quad (3)$$

the probability density function of data $x_t$ is described by the following:

$$p(x_t | x_{t-k}^{t-1} : \theta) = \frac{1}{(2\pi)^{k/2}|\Sigma|^{1/2}} \exp\left[-\frac{1}{2}(x_t - \xi)^T \Sigma^{-1}(x_t - \xi)\right] \quad (4)$$

where $\xi$ is expressed as follows:

$$\xi = \sum_{i=1}^{k} A_i w_{t-i} + \mu \quad (5)$$

and we write the following for the parameter vector:

$$\Theta = (A_1, \ldots, A_k, \mu, \Sigma) \quad (6)$$

The change-point detection apparatus of the present invention is not limited to the AR model, and other time-series models may be used, examples of which are an auto-regression moving average (ARMA) model and a moving average (MA) model.

Figure 3:
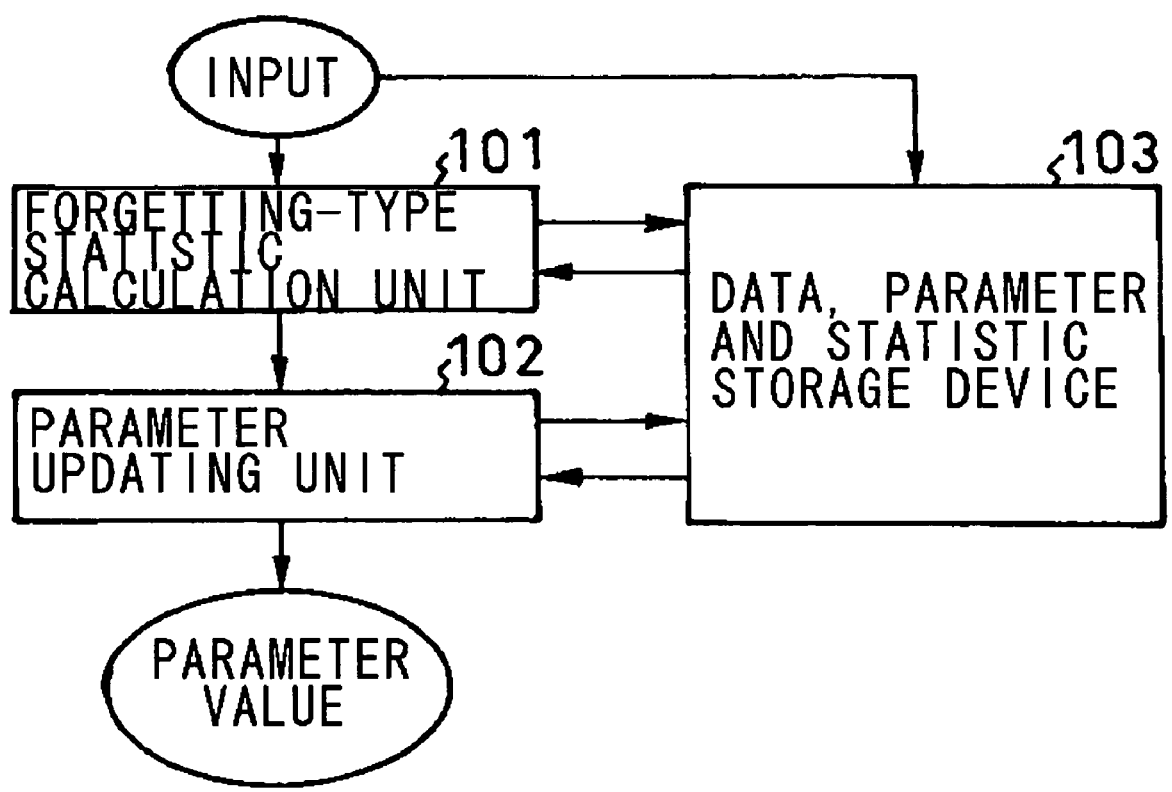
FIG. 3 is a block diagram illustrating the structure of a time-series model learning unit shown in FIG. 1.

FIG. 3 is a block diagram illustrating in detail the structure of the time-series model learning unit 11. As shown in FIG. 3, the time-series model learning unit 11 comprises a forgetting-type statistic calculation unit 101, a parameter updating unit 102 and a data, parameter and statistic storage device 103.

Figure 4:
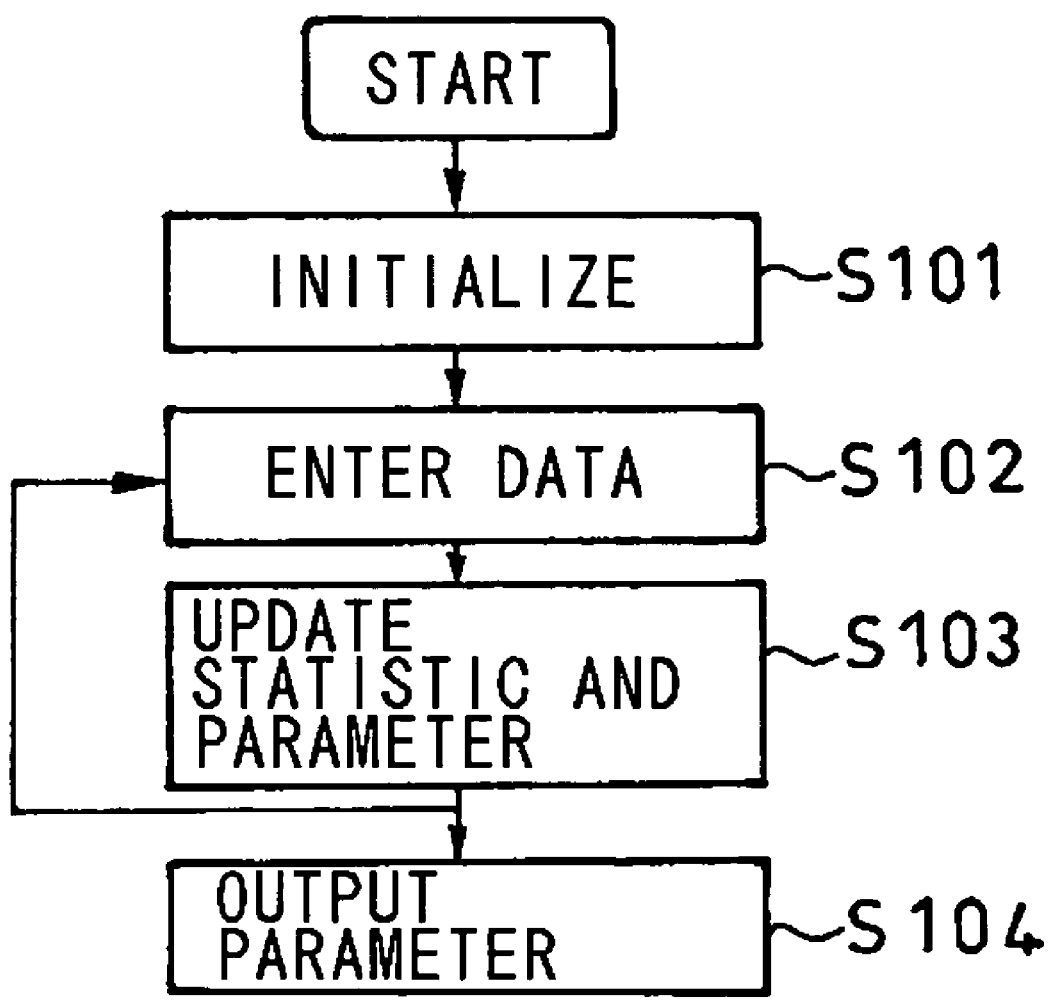
FIG. 4 is a flowchart illustrating the operation of the time-series model learning unit shown in FIG. 1.

FIG. 4 is a flowchart illustrating the operation of the time-series model learning unit 11 shown in FIG. 3. The time-series model learning unit 11 of FIG. 3 operates as follows:

While sequentially reading in a data sequence, the time-series model learning unit 11 updates parameters sequentially based upon the data read. We write $\Theta(t)$ for a parameter value obtained as a result of learning using data from $x_1$ to $x_t$. When the AR model is adopted as the time-series model, the parameter value $\Theta(t)$ can be updated. This will be outlined in the below.

First, the value of each parameter that has been stored in the data, parameter and statistic storage device 103 is initialized before data is read in (step S101).

Next, operation is as follows whenever the $t^{th}$ item of data $x_t$ is entered:

When the data $x_t$ is input to the forgetting-type statistic calculation unit 101 and to the data, parameter and statistic storage device 103 (step S102), the data, parameter and statistic storage device 103 erases the oldest of the data stored therein, stores the latest data xt instead and obtains the data sequence $x_t, x_{t-1}, \ldots, x_{t-k+1}$.

The forgetting-type statistic calculation unit 101 updates the data sequence $x_t, x_{t-1}, \ldots, x_{t-k+1}$, which is supplied from the data, parameter and statistic storage device 103, and retained sufficient statistics $\mu$ and $C_j$ (j=0, ..., k) according to the respective update rules expressed by the following expressions (7) and (8) (step S103):

$$\mu := (1-r)\mu + rx_t \quad (7)$$

$$C_j := (1-r)C_j + r(x_t - \mu)(x_{t-j} - \mu)^T \quad (8)$$

and sends the sufficient statistics obtained to the data, parameter and statistic storage device 103, where the sufficient statistics are stored, and to the parameter updating unit 102.

The parameter updating unit 102 finds a solution to the following equation (9), which is a simultaneous equation in which an n-order square matrix $B_i$ (i=1, ..., k) is an unknown:

$$C_j = \sum_{i=1}^{k} B_i C_{j-i} (j = 1, \cdots k) \quad (9)$$

where we assume the following holds:

$$C_{-j} = C_j^T \quad (10)$$

where T denotes Transpose operation.

Next, the parameter updating unit 102 substitutes the found solution into $A_i$, calculates the parameter according to the following equations (11) and (12) (step 103):

$$\hat{x}_t := \sum_{i=1}^{k} A_i(x_{t-i} - \mu) + \mu \quad (11)$$

$$\Sigma := (1-r)\Sigma + r(x_t - \hat{x}_t)(x_t - \hat{x}_t)^T \quad (12)$$

and outputs the obtained parameter value $\Theta = (A1, \ldots Ak, \mu, \Sigma)$(step 104).

Further, the parameter updating unit 102 sends the parameter value $\Theta$ to the data, parameter and statistic storage device 103, where the parameter value is stored.

The time-series model learning unit 11 is a device for updating the estimated parameter value by adopting a forgetting parameter that takes on values of 0 to 1 as $\tau$, multiplying the past sufficient statistic by a factor of $(1-\tau)$, multiplying the new sufficient statistic by a factor of $\tau$ and updating the sufficient statistic by a weighted mean. The time-series model learning unit 11 has the effect of gradually forgetting the influence of old data. If we write 1/t for the forgetting parameter $\tau$ with regard to the $t^{th}$ item of data $x_t$ in the input data sequence, this will correspond to sequential execution of the usual maximum likelihood estimation.

The parameter value $\Theta$ calculated by the time-series model learning unit 11 is supplied to the complexity and parameter storage device 14.

The loss-function calculating unit 13 reads in the parameter value $\Theta(t-1)$ of the previous point in time from the time-series model learning unit 11 or complexity and parameter storage device 14 with respect to the input data $x_t$ at each time t and calculates loss as follows (step S13):

$$-\log p[x_i|x^{t-1},\theta^{(t-1)}] \qquad (13)$$

The loss value calculated has the meaning of a fitting error that is the result of fitting the time-series model to the data. The loss value is sent to the complexity calculating unit 12, which proceeds to calculate the following equations (14), (15) and (16) as complexities at each time r (step S14):

$$SC(x^N) = -\sum_{i=1}^{N} \log p[x_i | x^{i-1}, \theta^{(i-1)}] \qquad (14)$$

$$SC(x^r) = -\sum_{i=1}^{r} \log p[x_i | x^{i-1}, \theta^{(i-1)}] \qquad (15)$$

$$SC(x_{r+1}^N) = -\sum_{i=1}^{N} \log p[x_i | x^{i-1}, \theta_{r+1}^{(i-1)}] \qquad (16)$$

where the following expression (17) represents the value of a parameter estimated using $x_{r+1}, \ldots, x_{i-1}$:

$$\theta_{r+1}^{(i-1)} \qquad (17)$$

This value also is calculated by the time-series model learning unit 11 and the result is supplied to and stored in the complexity and parameter storage device 14.

The value of the expression (14) is a quantity referred to as predictive probabilistic complexity with respect to the data sequence $x^N = x_1, x_2, \ldots, x_N$ and is the total code length when the data sequence $x^N$ is encoded sequentially using the parameter value $\Theta(t-1)$ with regard to each $x_t$.

Since the following relation (18) holds, the complexity calculating unit 12 is capable of sequentially calculating predictive probabilistic complexity:

$$SC(x^{r+1}) = SC(x^r) - \log p[x_{r+1}|x^r, \theta^{(r)}] \qquad (18)$$

The result of calculation by the complexity calculating unit 12 is supplied to the complexity and parameter storage device 14.

The change-point searching unit 15 calculates a change-point score SCORE(r) (step S15) using the values of $SC(x^N)$, $SC(x^r)$ and $SC_{r+1}^{(i-1)}$ supplied from the complexity and parameter storage device 14 with regard to each time r (r= 2, ..., N). The change-point score SCORE(r) represents the magnitude of the possibility that time point r is a change point. By way of example, SCORE(r) is calculated as follows:

$$\text{Score}(r) = SC(x^N) - [SC(x^r) + SC(x_{r+1}^N)] \qquad (19)$$

The value of $SC(x^N)$ calculated with the equation (14) is the predictive probabilistic complexity when the data sequence $x^N$ is described by a simple model, whereas the sum of $SC(x^r)$ and $SC_{r+1}^{(i-1)}$ respectively calculated with the equations (15) and (16) is the sum total of predictive probabilistic complexities when the model is fit discontinuously about the time point r as the boundary.

If the time point r is truly a change point, then the sum of $SC(x^r)$ and $SC_{r+1}^{(i-1)}$ will be significantly smaller than the value of $SC(x^N)$. Accordingly, it will be understood that the larger the value of SCORE(r), the greater the possibility that the time point r is a change point.

The change-point searching unit 15 provides a certain threshold value $\delta$, searches time points at which the value of SCORE(r) exceeds the threshold value $\delta$ for the largest value of SCORE(r), regards this time point r as a change point and outputs the same (step S16).

One change point can be found in the input data sequence $x^N$ with this method. Iteration of this method makes it possible to find a plurality of change points.

Further, instead of the equation (19), the score can also be calculated with the following equation (20):

$$\text{Score}(r) = \{SC(x^N) - [SC(x^r) + SC(x_{r+1}^N)]\}/SC(x^N) \qquad (20)$$

In the above equation (13), code length is adopted as the loss function. However, the following expression (21), which is a quadratic loss function, can also be used, where $\hat{x}_t$ is adopted as a predicted value with respect to data $x_t$ as time point t:

$$(\hat{x}_t - x_t)^2 \qquad (21)$$

Furthermore, this can be replaced by the following general loss function (22):

$$L(\hat{x}_t, x_t) \qquad (22)$$

At this time predictive probabilistic complexity ESC is replaced by cumulative loss relating to the general loss function as follows:

$$ESC(xN) = \sum_{t=1}^{N} L(\hat{x}_t, x_t) \qquad (23)$$

What follows is generally assumed to be an extension of such case.

[Second Embodiment]

Figure 5:
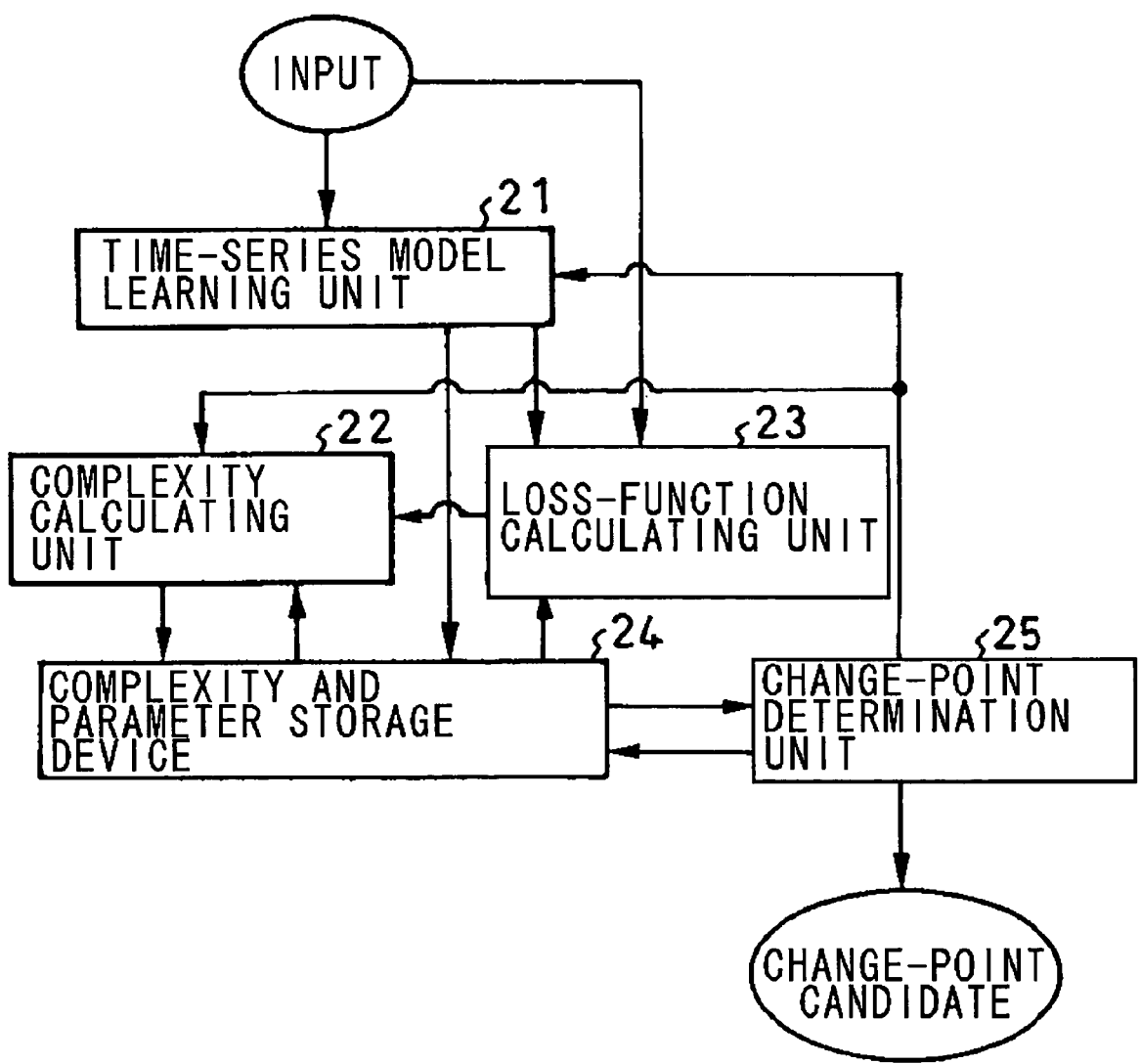
FIG. 5 is a block diagram illustrating the structure of a change-point detection apparatus according to a second embodiment of the present invention.

FIG. 5 is a block diagram illustrating the structure of a change-point detection apparatus according to a second embodiment of the present invention. The change-point detection apparatus according to this embodiment comprises a time-series model learning unit 21, a complexity calculating unit 22, a loss-function calculating unit 23, a complexity and parameter storage device 24, and a change-point determination unit 25. The change-point detection apparatus reads in data sequentially and detects change points in a data sequence that has been read in the past.

Figure 6:
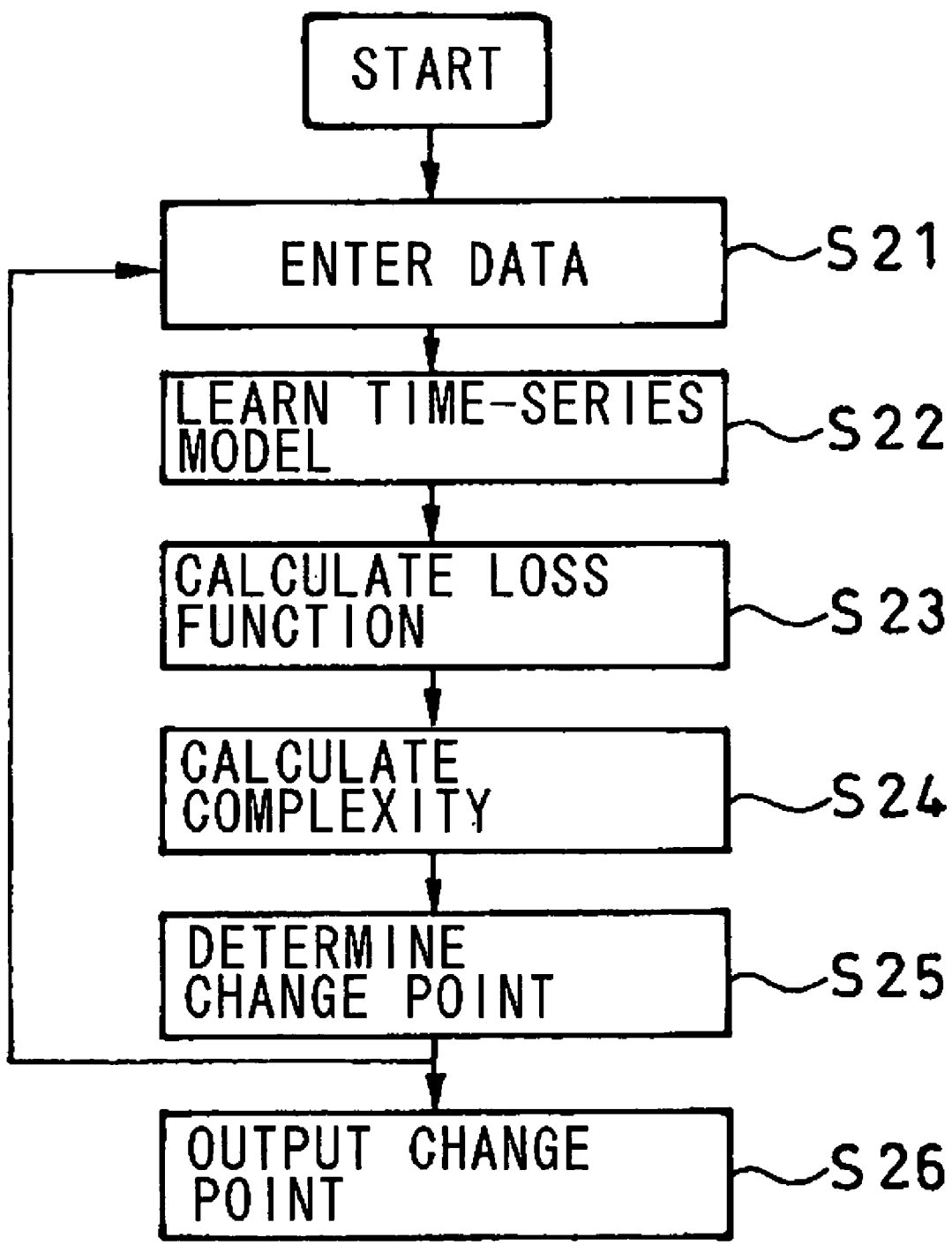
FIG. 6 is a flowchart illustrating operation of the change-point detection apparatus according to the second embodiment.

FIG. 6 is a flowchart illustrating operation of the change-point detection apparatus according to the second embodiment.

Components not specifically mentioned in the description of the second embodiment are implemented in a manner similar to corresponding components in the change-point detection apparatus according to the first embodiment of FIG. 1. These components will not be described again in detail.

The operation of the change-point detection apparatus according to the second embodiment thus constructed will be described with reference to FIGS. 5 and 6.

The operation of steps S21 to S24 basically is the same as that of steps S11 to S14 in FIG. 2. Operation differs only in that (a) as data is input sequentially, the point in time at which calculation is started is the time at a change point detected last by the change-point determination unit 25, and (b) an end point is a time point t that changes and is not a fixed N.

More specifically, the time-series model learning unit 21 loads data prevailing at the present time point in order to estimate parameters (step S21), inputs the time of the change point detected last by the change-point determination unit 25, adopts this point as a starting point and sequentially calculates parameters up to the present point in time in a manner similar to that of the time-series model learning unit 11 (step S22). The value calculated is sent to and stored in the complexity and parameter storage device 24.

The loss-function calculating unit 23 calculates the value of the loss function in a manner similar to that of the loss-function calculating unit 13 using the input data and the parameter value supplied from the complexity and parameter storage device 24, and sends the calculated value to the complexity calculating unit 22 (step S23).

The complexity calculating unit 22 receives inputs from the loss-function calculating unit 23 and complexity and parameter storage device 24, adopts the time of the change point detected last by the complexity and parameter storage device 24 as an input, adopts this as a starting point, adopts the present point in time as an end point and calculates the value of complexity in a manner similar to that of the time-series model learning unit 11 (step S24).

If the present point in time is t and a change point has been found in the past, then the change-point determination unit 25 searches for a change point over a range in which this time point is the starting point. That is, if we let $v_i$ represent the last detected change point in the past, then the change-point determination unit 25 calculates change-point SCORE $(r;v_i,t)$ at time r ($v_i$ r<t). The change-point SCORE $(r;v_i,t)$ is calculated as follows, by way of example:

$$\text{Score}(r;v_i,t) = \{SC(x_{v_i}^t) - [SC(x_{v_i}^r) + SC(x_{r+1}^t)]\}/(t-v_i+1) \quad (24)$$

Accordingly, if the score exceeds the predetermined threshold value δ, taking into consideration the minimization relating to time r as expressed by the following expression (25), then it is decided that a change point has occurred at time r that gives the minimum value of the Score $(r;v_i,t)$ (step S25) and this change point is output (step S26).

$$\min_r \text{Score}(r; v_i, t) \quad (25)$$

Further, data is input and control returns to step S21.

It is assumed that the range over which the time point r moves is $v_i+1$ to t−1. However, by providing a certain width D and making the range t−D to t−1, the required amount of memory and amount of calculation is held below a fixed value.

The change-point determination unit 25 is capable of calculating Score $(r;v_i,t)$ given by the equation (24) efficiently. The method of calculation will now be described. The calculation procedure, which is performed upon reading in one item of data, shall be referred to as one iteration.

In one iteration in which data $x_t$ has been read in anew, the change-point determination unit 25 calculates the following (26) with regard to time point r=t−D, . . . , t−1 (or r=$v_i$+1, . . . , t−1) and supplies the calculated values to the complexity and parameter storage device 24, where it is stored:

$$SC(x_{v_i}^r), SC(x_{x_{r+1}}^t) \quad (26)$$

Next, in one iteration in which data $x_{t+1}$ has been read in anew, the change-point determination unit 25 obtains the following (27) with regard to time point $$r = t - D + 1, \cdots, t \ (\text{or } r = v_i + 1, \cdots, t): \quad (27)$$

$$SC(x_{v_i}^r), SC(x_{x_{r+1}}^{t+1})$$

At this time the value already obtained in the previous iteration is read in from the complexity and parameter storage device 24 and used to give the following:

$$SC(x_{v_i}^i)(i=t-D+1, \ldots, t-1) \quad (28)$$

Further, with regard to time point r=t, the change-point determination unit 25, using the result of calculation obtained by the loss-function calculating unit 23, performs a sequential calculation as follows:

$$SC(x_{v_i}^t) = SC(x_{v_i}^{t-1}) - \log p[x_t|x^{t-1}, \theta_{v_i}^{(t-1)}] \quad (29)$$

and sends it to the complexity and parameter storage device 24, where it is stored:

In a case where the time-series model is the AR model, the value is obtained without using past data if the sufficient statistic also is stored at the same time as the estimation parameter value. In other words, it is unnecessary to store old data in advance.

Furthermore, with regard to time r=t+1, the change-point determination unit 25, using the result of calculation obtained by the loss-function calculating unit 23, performs a sequential calculation as follows:

$$SC(x_{r+1}^{t+1}) = SC(x_{r+1}^t) - \log p[x_{t+1}|x^t, \theta^{(r+1)}] \quad (30)$$

With the method of calculation described above, 2D-number of values of SC are always stored in advance, 1+D-number of these are erased every iteration, and D-number obtained by updating are stored anew.

In other words, the following quantity is stored in advance:

$$[SC(x_{v_i}^{t-D}), \theta_{v_i}^{(t-D)}], [SC(x_{v_i}^{t-D+1}), \theta_{v_i}^{(t-D+1)}], \ldots,$$
$$[SC(x_{v_i}^{t-2}), \theta_{v_i}^{(t-2)}], [SC(x_{v_i}^{t-1}), \theta_{v_i}^{(t-1)}], [SC(x_{v_i}^t),$$
$$\theta_{v_i}^{(t)}], [SC(x_{t-D+1}^t), \theta_{t-D+1}^{(t)}], [SC(x_{t-D+2}^t), \theta_{t-D+2}^{(t)}], \ldots, [SC(x_{t-1}^t), \theta_{t-1}^{(t)}] \quad (31)$$

When data $x_{t+1}$ has been read in anew, the necessary quantity is as follows, where the quantity to be calculated anew on the first line is only the final one:

$$[SC(x_{v_i}^{t-D+1}), \theta_{v_i}^{(t-D+1)}], [SC(x_{v_i}^{t-D+2}), \theta_{v_i}^{(t-D+2)}], \ldots,$$
$$[SC(x_{v_i}^{t-1}), \theta_{v_i}^{(t-1)}], [SC(x_{v_i}^t), \theta_{v_i}^{(t)}], [SC(x_{v_i}^{t-1}),$$
$$\theta_{v_i}^{(t+1)}], [SC(x_{t-D+2}^{t+1}), \theta_{t-D+2}^{(t+1)}], [SC(x_{t-D+3}^{t+1}), \theta_{t-D+3}^{(t+1)}], \ldots, [SC(x_t^{t+1}), \theta_t^{(t+1)}] \quad (32)$$

The second line requires the entire quantity to be updated, though this is carried out sequentially by performing a calculation similar to that of $SC(x_{r+1}^{t+1}) = SC(x_{r+1}^t) - \log p[x_{t+1}|x^t, \theta^{(r+1)}]$.

Further, by limiting the search range of time point r to a value obtained by dividing by an integer I, the number stored and the number updated can be reduced to 1/I.

[Third Embodiment]

Figure 7:
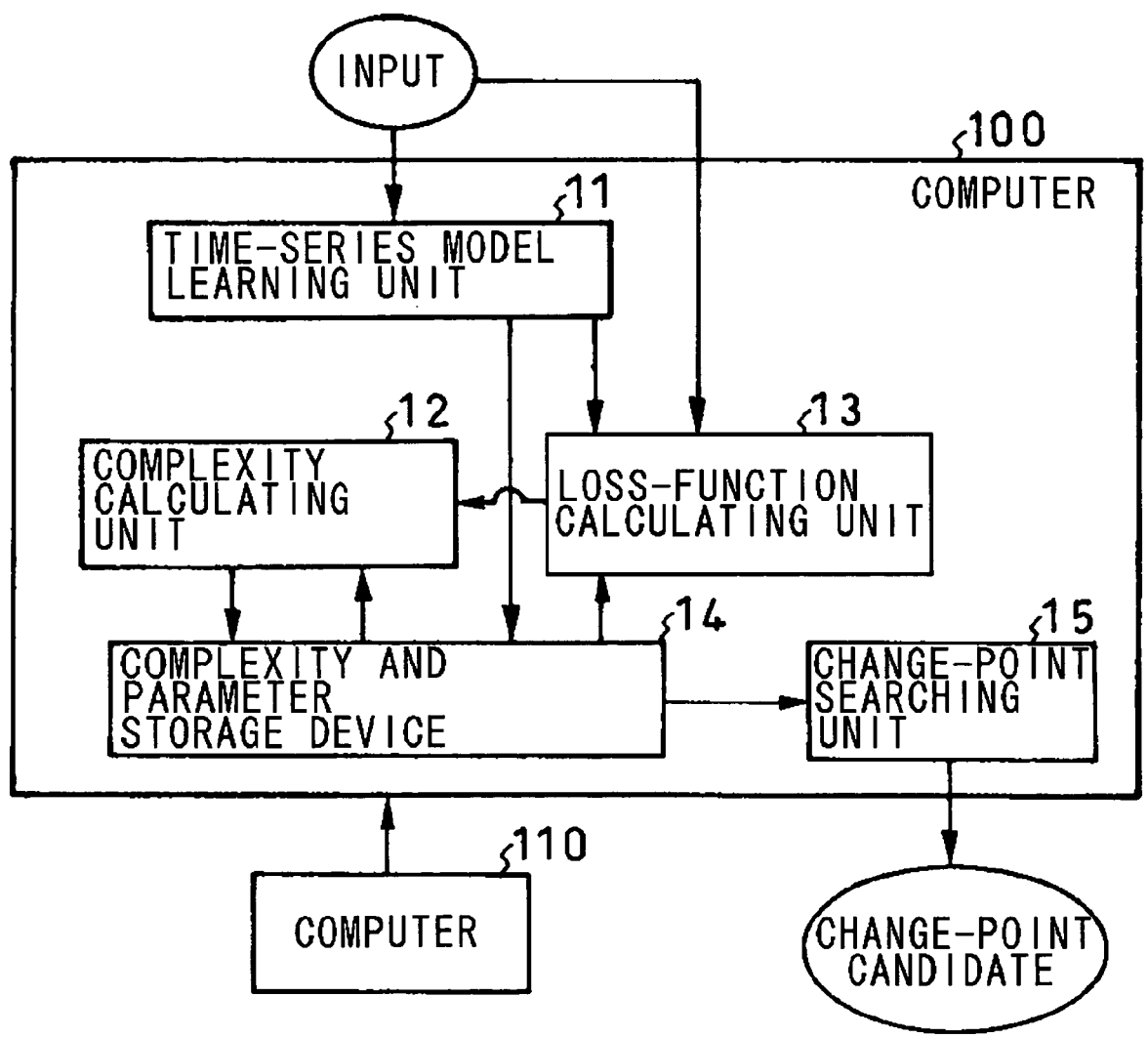
FIG. 7 is a block diagram illustrating the structure of a change-point detection apparatus according to a third embodiment of the present invention.

FIG. 7 is a block diagram illustrating the structure of a change-point detection apparatus according to a third embodiment of the present invention. The change-point detection apparatus according to this embodiment differs only in that a change-point detection program 110 is added to a computer 100 that implements the change-point detection apparatus according to the first embodiment shown in FIG. 1. Accordingly, other components not specifically mentioned are designated by like reference characters and are not described again in detail.

The change-point detection program 110 is read into the computer 100 and controls the computer 100 as the change-point detection apparatus comprising the time-series model learning unit 11, complexity calculating unit 12, loss-function calculating unit 13, complexity and parameter storage device 14 and change-point searching unit 15. Since the operation of the computer 100 under the control of the change-point detection program 110 is exactly the same as the operation of the change-point detection apparatus in the first embodiment, the operation need not be described in detail again.

[Fourth Embodiment]

Figure 8:
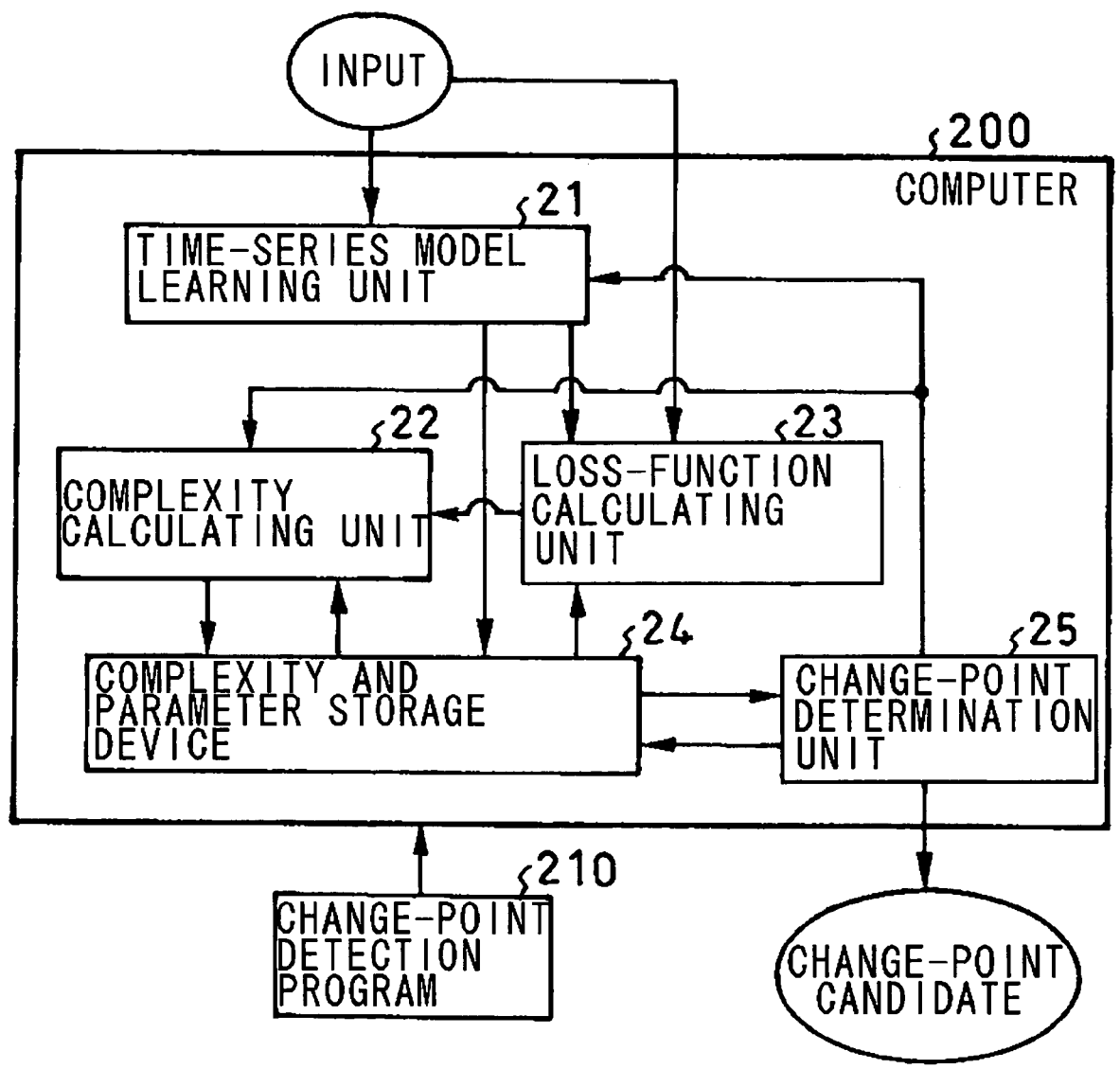
FIG. 8 is a block diagram illustrating the structure of a change-point detection apparatus according to a fourth embodiment of the present invention.

FIG. 8 is a block diagram illustrating the structure of a change-point detection apparatus according to a fourth embodiment of the present invention. The change-point detection apparatus according to this embodiment differs only in that a change-point detection program 210 is added to a computer 200 that implements the change-point detection apparatus according to the second embodiment shown in FIG. 5. Accordingly, other components not specifically mentioned are designated by like reference characters and are not described again in detail.

The change-point detection program 210 is read into the computer 200 and controls the computer 200 as the change-point detection apparatus comprising the time-series model learning unit 21, complexity calculating unit 22, loss-function calculating unit 23, complexity and parameter storage device 24 and change-point searching unit 25. Since the operation of the computer 200 under the control of the change-point detection program 210 is exactly the same as the operation of the change-point detection apparatus in the second embodiment, the operation need not be described in detail again.

A first effect of the present invention is that fitting and fitting error can be calculated online and change-point detection can be performed efficiently. The reason for this is that fitting error is calculated using as a criterion a predictive probabilistic complexity capable of being calculated sequentially, and a change point can be detected based upon the fitting error.

A second effect of the present invention is that change points can be detected efficiently by performing model fitting in conformity with model discontinuity. The reason for this is that a change point is detected by fitting a different model before and after a change point, calculating the fitting error using predictive probabilistic complexity and comparing this error with fitting error of a model when it is assumed that no change point is present.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A change-point detection apparatus for reading in time-series data sequentially as an input and detecting a change point which is a time point where the input time-series data changes suddenly, comprising:

a time-series model learning unit for learning parameters of a time-series model sequentially while the time-series data is being read in;

a storage device for storing the parameters of the time-series model, which have been learned by the time-series model learning unit, and complexity as fitting error that results when the time-senes model is fit to the input time-series data;

a loss-function calculating unit for reading the pararneters from said storage device and calculating loss of the time-series model with regard to each item of the input time-series data one at a time;

a complexity calculating unit for reading parameters and complexity from said storage device, calculating complexity of a partial series of the input time-series data sequentially while updating the same, and updating content stored in the storage device; and a change-point searching unit for reading complexity with regard to time-series data before and after change-point candidates from the storage device with respect to all change-point candidates of the input time-series data and comparing the sum of the complexities before and after the change-time candidates with complexity when a change point is assumed to be absent, thereby calculating change-point score and detecting a change point; wherein the change point detected by the change-point searching unit is output.

2. A change-point detection apparatus for reading in time-series data sequentially as an input and detecting a change point which is a time point where the input time-series data changes suddenly, comprising:

a time-series model learning unit for learning parameters of a time-series model sequentially while the time-series data is being read in;

a storage device for storing the parameters of the time-series model, which have been learned by said time-series model learning unit, and complexity as fitting error that results when the time-senes model is fit to the input time-series data;

a loss-function calculating unit for reading parameters from said storage device and calculating loss of the time-series model with regard to each item of the input time-series data one at a time;

a complexity calculating unit for sequentially adding a loss value calculated by said loss-function calculating unit to complexity read in from said storage device, thereby calculating complexity as fitting error that results when the time-series model is fit to a partial series of the input time-series data, and updating content stored in said storage device; and a change-point determination unit for reading complexity with regard to time-series data before and after change-point candidates from the storage device with respect to all change-point candidates of the input time-series data and comparing the sum of the complexities before and after the change-time candidates with complexity when a change point is assumed to be absent, thereby calculating change-point score and detecting a change point; wherein the change point detected by the change-point determination unit is output.

3. A change-point detection method for reading in time-series data sequentially as an input and detecting a change point which is a time point where the input time-series data changes suddenly, comprising:
   a step of reading in time-series data sequentially;
   a step of learning parameters of a time-series model sequentially from the input time-series data;
   a loss-function calculating step of calculating loss of the time-series model with regard to each item of the input time-series data one at a time;
   a complexity calculating step of sequentially calculating complexity as fitting error that results when the time-series model is fit to the input time-series data; and
   a change-point searching step of calculating complexity with regard to time-series data before and after change-point candidates with respect to all change-point candidates of the input time-series data and comparing the sum of the complexities before and after the change-time candidates with complexity when a change point is assumed to be absent, thereby calculating change-point score and detecting a change point; wherein the change point detected at said change-point search step is output.

4. A change-point detection method for reading in time-series data sequentially as an input and detecting a change point which is a time point where the input time-series data changes suddenly, comprising:
   a step of reading in time-series data sequentially;
   a step of learning parameters of a time-series model sequentially from the input time-series data;
   a loss-function calculating step of calculating loss of the time-series model with regard to each item of the input time-series data one at a time;
   a complexity calculating step of sequentially adding a loss value calculated at said loss-function calculating step, thereby calculating complexity as a fitting error that results when the time-series model is fit to a partial series of the input time-series data; and
   a change-point determination step of reading, from a storage device, complexity with regard to time-series data before and after change-point candidates with respect to all change-point candidates of the input time-series data and comparing the sum of the complexities before and after the change-time candidates with complexity when a change point is assumed to be absent, thereby calculating change-point score and detecting a change point; wherein the change point detected at said change-point determination step is output.

5. A computer program product for enabling a computer system to carry out a computer-assisted method for reading in time-series data sequentially as an input and detecting a change point, comprising:
   software instructions for the computer system, and
   a computer readable medium including the software instructions;
   wherein the software instructions define operations, comprising:
   reading time-senes data seciuentially,
   learning parameters of a time-series model sequentially while the time-series data is being read in;
   storing the parameters of the time-series model, which have been learned by said time-series model learning means, and complexity as fitting error that results when the time-series model is fit to the input time-series data;
   reading parameters from said storage device and calculating loss of the time-series model with regard to each item of the input time-series data one at a time;
   reading parameters and complexity from said storage device, calculating complexity of a partial series of the input time-series data sequentially while updating the same, and updating content stored in said storage device; and
   reading complexity with regard to time-series data before and after change-point candidates from the storage device with respect to all change-point candidates of the input time-series data and comparing the sum of the complexities before and after the change-time candidates with complexity when a change point is assumed to be absent, thereby calculating change-point score and detecting a change point.

6. A computer program product for enabling a computer system to carry out a computer-assisted method for reading in time-series data sequentially as an input and detecting a change point, comprising:
   software instructions for the computer system, and
   a computer readable medium including the software instructions;
   wherein the software instructions define operations, comprising:
   reading time-series data sequentially,
   learning parameters of a time-series model sequentially while the time-series data is being read in;
   storing the parameters of the time-series model, which have been learned by said time-series model learning means, and complexity as fitting error that results when the time-series model is fit to the input time-series data;
   reading parameters from said storage device and calculating loss of the time-series model with regard to each item of the input time-series data one at a time;
   sequentially adding a loss value calculated by said loss-function calculating means to complexity read in from said storage device, thereby calculating complexity as fitting error that results when the time-series model is fit to a partial series of the input time-series data, and updating content stored in said storage device; and
   reading complexity with regard to time-series data before and after change-point candidates from said storage device with respect to all change-point candidates of the input time-series data and comparing the sum of the complexities before and after the change-time candidates with complexity when a change point is assumed to be absent, thereby calculating change-point score and detecting a change point.

* * * * *